United States Patent [19]

Benjamin

[11] 4,338,723
[45] Jul. 13, 1982

[54] ANGLE MEASURING DEVICE

[75] Inventor: Harry L. Benjamin, Dayton, Ohio

[73] Assignee: Centro Cororation, Dayton, Ohio

[21] Appl. No.: 109,722

[22] Filed: Jan. 4, 1980

Related U.S. Application Data

[63] Continuation-in-part of Ser. No. 843,414, Oct. 19, 1977, abandoned.

[51] Int. Cl.³ .......................... G01B 7/30; G01C 9/06
[52] U.S. Cl. .............................. 33/174 L; 33/185 R; 33/DIG. 5
[58] Field of Search ................. 33/174 L, 185 R, 366, 33/DIG. 5

[56]  References Cited
U.S. PATENT DOCUMENTS

| | | | |
|---|---|---|---|
| 2,608,767 | 9/1952 | Hall | 33/201 |
| 2,674,146 | 4/1954 | Rice | 92/44 |
| 3,040,435 | 6/1962 | Huyser | 33/174 L |
| 3,457,780 | 7/1969 | Agostini | 73/139 |
| 3,643,501 | 2/1972 | Pauley | 73/133 R |
| 3,696,513 | 10/1972 | Sullivan | 33/174 L |
| 3,707,043 | 12/1972 | Jones | 33/185 R |
| 3,810,312 | 5/1974 | Carson | 33/227 |
| 3,911,592 | 10/1975 | Crask | 33/366 |
| 3,944,798 | 3/1976 | Eaton | 235/151.3 |
| 4,008,772 | 2/1977 | Boys | 173/12 |
| 4,026,369 | 5/1977 | Vliet | 173/12 |

Primary Examiner—Charles A. Ruehl
Attorney, Agent, or Firm—Biebel, French & Nauman

[57] ABSTRACT

An angle measuring device for establishing a position of a frame member in two orthogonal planes or in an azimuth plane, relative to a reference plane, comprising a frame member supporting a plurality of equally radially and angularly spaced linear potentiometers having rods which engage a base plate and are pivotally connected thereto to permit the frame to be swiveled in any location about the base plate. The potentiometers are calibrated to provide an indication of the position of the frame relative to the base plate as a result of movement of the rods within the potentiometers.

14 Claims, 22 Drawing Figures

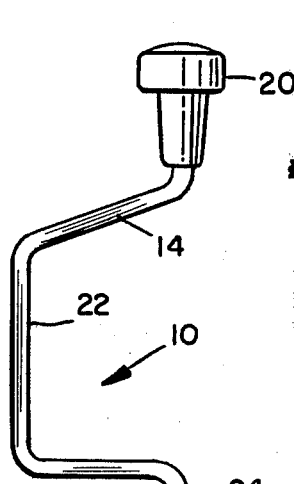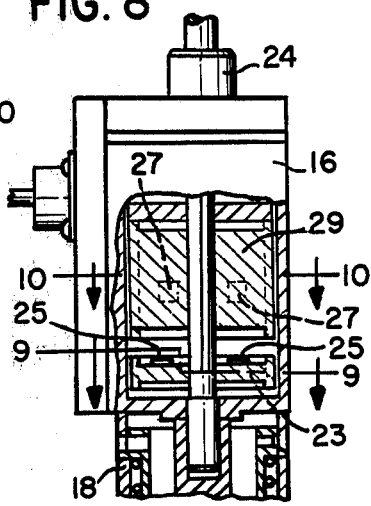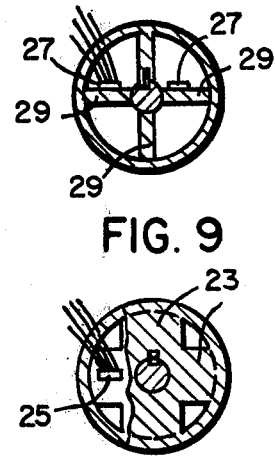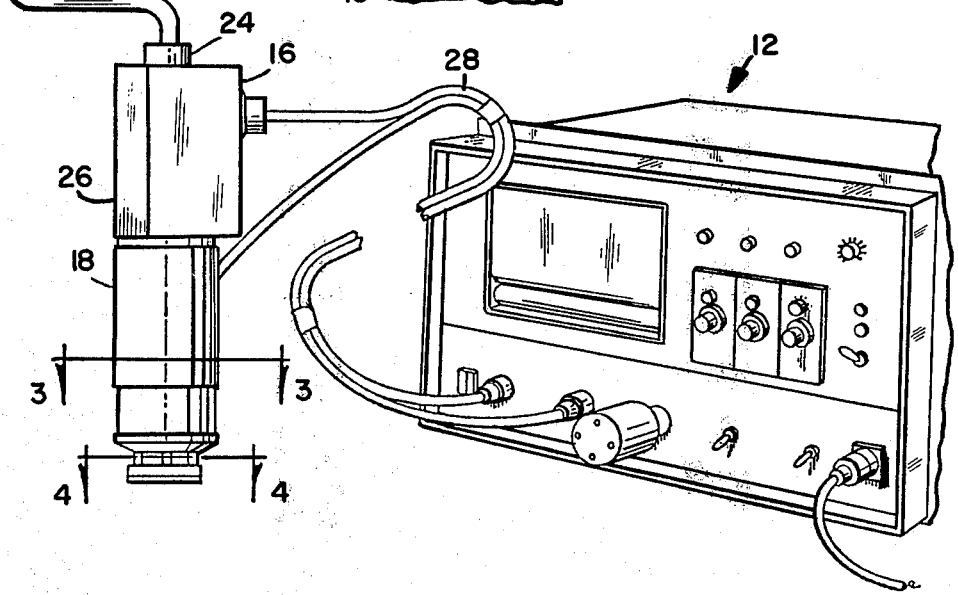

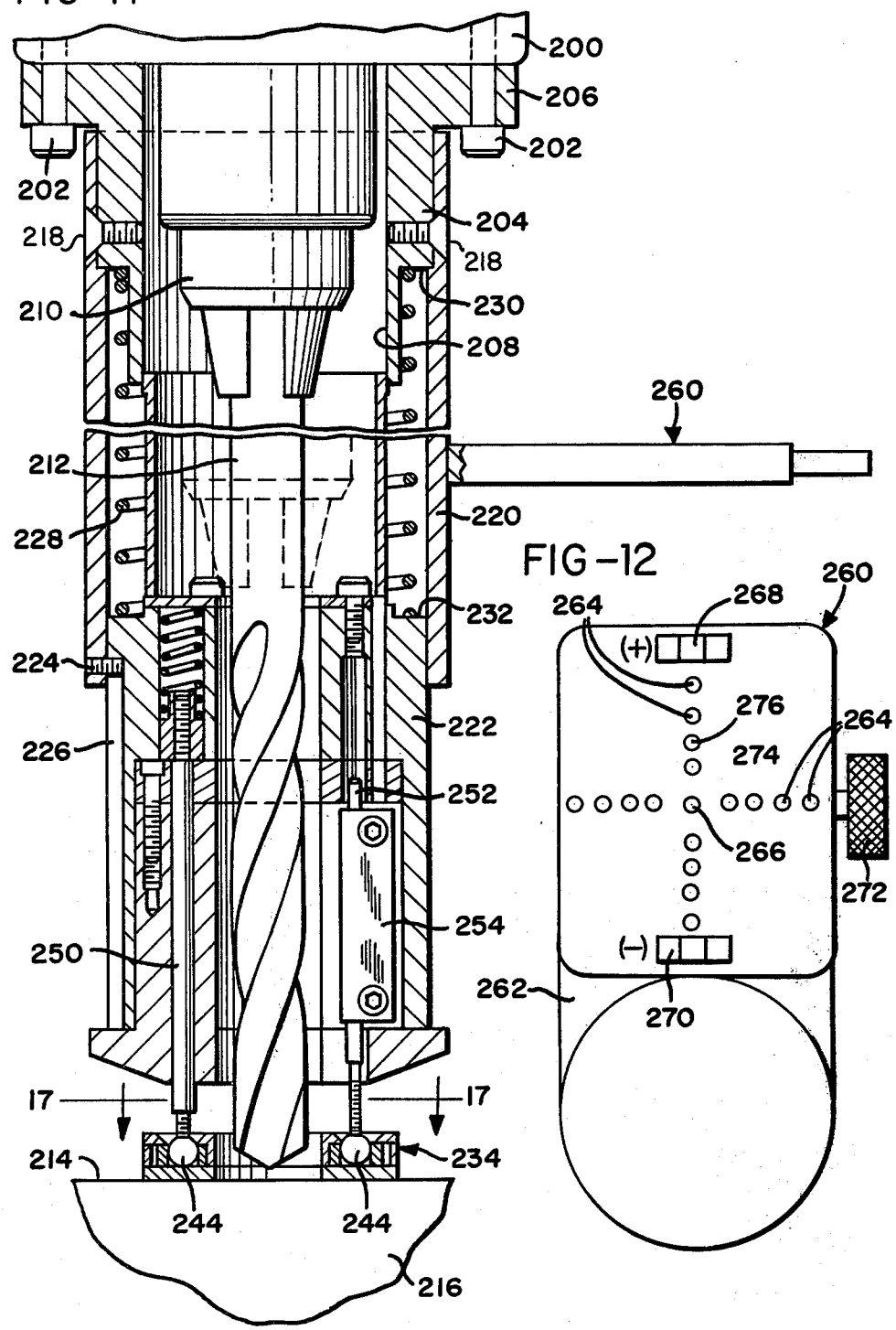

ANGLE MEASURING DEVICE

CROSS REFERENCE TO RELATED APPLICATION

This application is a continuation-in-part of application Ser. No. 843,414, filed Oct. 19, 1977, now abandoned.

BACKGROUND OF THE INVENTION

1. Field of the Invention

The present invention relates to an angle measuring device, and more particularly, to a device for constantly electronically monitoring the relative positions between a frame structure and a reference surface in two orthogonal planes which are each perpendicular to a third reference plane.

2. Prior Art

There are many industries in which the relative angular position between two members must be known. In some situations accuracy of measurement is important, while in others, the angular measurement must be made quickly and continuously in order to constantly monitor the relative angle so that continuous corrections can be made if necessary.

Many such devices cannot be made sufficiently portable, due to their complexity or alignment sensitivity, that they can be utilized in many situations where it is desired to have an accurate and/or immediate angular measurement. In addition, such devices generally do not permit the simultaneous indication of the relative angular position between two objects in orthogonal planes or permit the resolution of the angle in two planes to the angle in an azimuth plane perpendicular to the base reference plane.

In other words, it is sometimes desired, for example, to measure or check the relative perpendicularity of a stud to the surface from which it extends, or of the relative perpendicularity between two flat surfaces. This involves measuring the relative positions in two dimensions relative to a base plane or third dimension. Thus, for example, in the case of a stud, it is a question of determining the position of the central axis of the stud relative to two orthogonal planes which extend perpendicular to the surface from which the stud extends. The stud could extend between the two reference planes and thus would have a projected angle in each of the reference planes as well as a single angle in the azimuth plane through the axis of the stud in which the actual angle of inclination exists. A similar measuring situation is required with regard to perpendicular or relatively angled surfaces.

This type of measurement requirement exists in many industries and has presented a substantial problem in that the equipment which has been devised to accomplish such measurements is not generally suited for ease of adaptation to other problem areas than that to which it was specifically designed.

SUMMARY OF THE INVENTION

The present invention provides an instrumented tool which can provide precise measurement of the relative angular positions between two members or surfaces, or can be modified to provide a less precise measurement, but a simplified and more easily utilized tool than what is available in the prior art.

These advantages are provided by an instrumented tool which basically comprises a frame structure which is coupled to a base plate forming a reference plane by means of a plurality of rods slidably supported in the frame and positioned at equally angularly and radially spaced locations around a central axis with the outer end portions of the rods pivotally mounted in the base plate in such a manner that the frame is free to pivot about the base plate as the rods move in and out of the frame while maintaining the central axis so that it intersects the plane of the bottom of the base plate at substantially the same position regardless of the relative angular position between the frame and the base plate.

The potentiometers are integral in a circuitry which provides continuous read-out of the relative angle between the frame and the base plate in two orthogonal planes perpendicular to the reference plane formed by the bottom of the base plate. If desired, the circuitry can be provided to give a continuous read out of the angle in the aximuth plane between the frame and the reference plane of the base plate.

In its preferred form there are four potentiometers, two each in perpendicular planes and four support rods which are equally radially and angularly interspersed between the potentiometer rods and which also engage the base plate and are pivotally connected thereto to provide the main support for the frame while the rods which engage the potentiometers are free to slide therein.

An important aspect of the present invention is the manner of connecting the plurality of rods, both the potentiometer rods and the support rods to the base plate. Although the base plate is not held in an exact concentric position with regard to the axis about which the rods are located, the exact angular orientation between the base plate and the frame structure is maintained regardless of the relative pivoting between the base plate and the frame. In order to accomplish this in one form, the base plate is provided with a plurality of radially extending grooves which extend from a central axis which would be in alignment with the axis of the position of the rods in the frame member when the frame is exactly perpendicular in all planes to the base plate reference plane. In an alternative form, since the movement of the rods radially outward as a result of relative angular movement of the frame and the base plate is not great, a plurality of cylindrical recesses may be used rather than radially extending slots, so long as the diameter of the cylindrical recesses are sufficient to permit the necessary outward radial and angular movement of the pivotal connection between the rods and the base plate to allow the desired degree of relative angular movement between the frame and the base plate.

In both cases a cylindrical member is supported in the radially expanding groove or cylindrical recess, and is connected to the bottom of each of the rods through a spherical bearing member so that each rod is permitted to pivot relative to the cylindrical support member while the cylindrical support member moves within the radial groove or cylindrical recess, as the frame is pivoted relative to the base plate. The extent of movement between the cylindrical support member and the cylindrical recess, for example, is determined through the mathmatical analysis which establishes the loci of points of tangency to the cylindrical support member which extends generally radially outwardly in the base plate as a result of angular movement of the frame in the opposite direction relative to the base plate. This degree of freedom is necessary in order to permit the frame to be moved relative to the base plate while not binding on the rods.

The basic concept of the device of the present invention can be utilized in many different environments. For example, it can be utilized as a stud perpendicularity measure relative to the surface in which the stud is positioned, by placing a central, cylindrical opening in the frame which matingly engages the outer surface of the stud and with a central circular opening in the base plate so that the instrumental tool can be positioned over the stud. Thus, the read out of the relative perpendicularity of the stud to the surface can easily be obtained.

As a further example of the utilization of this invention, it can be incorporated into a drilling device in which the drill extends through the central portion of the frame coaxially with the positions of the potentiometer rods, and through a corresponding cylindrical opening in the base plate. The base plate can then be positioned on the surface to be drilled and the drill moved until the proper angle, either perpendicular or some other desired relative angle to the surface, is established, and then the drill can be passed through the base plate by compression of the frame in order to drill the hole in the material. It is to be noted that compression of the frame for drilling is for a separate purpose and is independent of the relative positioning of the frame and base plate to establish perpendicularity.

A further utilization of the device is essentially as a carpenter's level in which the base plate is provided with a plumb bob type of pendulum member which then, due to gravity, holds the base plate in a horizontal position to form the reference plane relative to the surface of the earth and then the frame can be positioned against any surface whose relative angular position to the ground can be determined.

A still further example of the utilization of the present invention is in combination with a torque and thrust measuring device which can be adapted for utilization as a screwdriver to position threaded fasteners in openings so that the torque and thrust applied to the screwdriver, which is coupled to the frame, can be measured simultaneously with the relative angular position between the screwdriver and the surface in which the threaded fastener is being inserted in or removed from.

BRIEF DESCRIPTION OF THE DRAWINGS

FIG. 1 is a perspective view of a first preferred embodiment of the instrumented tool of the present invention including a torque and thrust measuring device, and which is connected to a visual readout apparatus;

FIG. 8 is a side view in partial cross section of the thrust and torque measuring portion of the preferred embodiment of FIG. 1;

FIG. 9 is a cross sectional view through line 9—9 of FIG. 8, illustrating a thrust measuring section of the device;

FIG. 10 is a cross sectional view along line 10—10 of FIG. 8, illustrating the torque measuring portion of the device;

FIG. 11 is a vertical cross sectional view through a second preferred embodiment of the present invention, where it is utilized as a drill angularity measuring device;

FIG. 12 is a top plan view of the embodiment of FIG. 11 showing the angle indicating device.

DETAILED DESCRIPTION OF THE PREFERRED EMBODIMENTS

Figure 2:
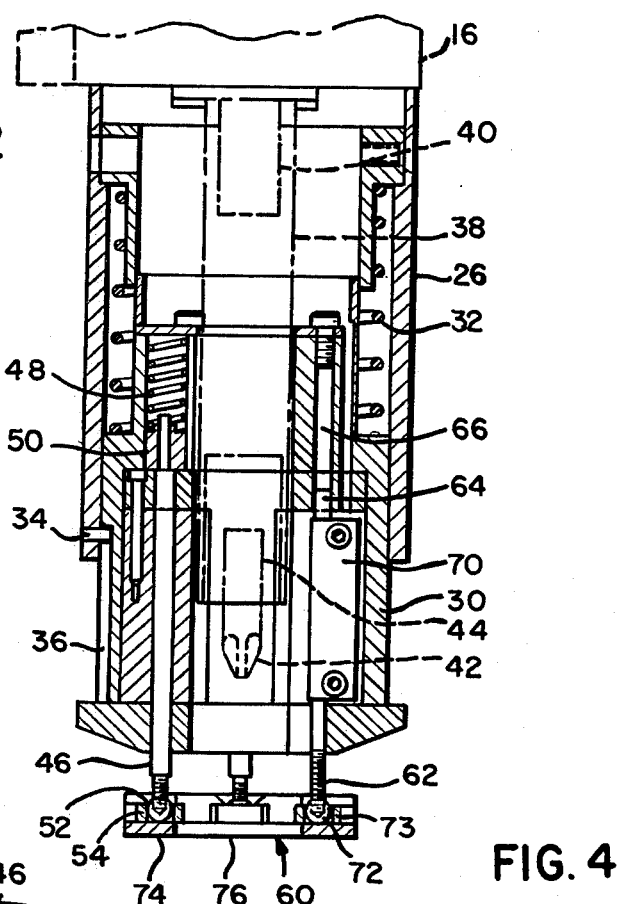
FIG. 2 is a vertical cross sectional view of the lower portion of the first preferred embodiment of FIG. 1.

Since the present invention was initially utilized in an instrumented tool of the type illustrated in FIGS. 1-10, it will initially be described in that embodiment which formed the subject matter of the related application referred to above.

The first preferred embodiment of the instrumented tool 10 of the present invention is seen in its overall configuration in FIG. 1, connected to a visual read-out device in the form of a graph recorder 12. The instrumented tool 10 basically consists of a crank handle 14, a thrust and torque measuring section 16 and an angle measuring section 18.

The crank handle 14 is of conventional construction with an upper handle 20 rotatably secured to the crank portion 22 which in turn has a female drive member 24 secured on the lower end portion thereof for rotation therewith. Drive member 24 mates with a corresponding male rectangular end portion of a main drive shaft (not shown) extending through the thrust and torque section 16.

The thrust and torque section 16 is contained within a housing 26. The thrust sensing device can, for example, be a thin plate 23 associated with a collar on the main drive shaft which when bent due to downward application of force applies force to the sensing members, such as strain gage load cells 25, as shown in FIGS. 8 and 9. The load cells 25 then produce an electrical output which is transmitted to the graph recorder 12 and amplified in order to produce a read-out thereon. The torque sensing device is associated with the main drive shaft and can also, for example, consist of strain gage type load cells 27 which measures the stress on the shaft through an associated collar having thin plate-like portions 29, as shown in FIGS. 8 and 10 and which produces an electrical output which can also be amplified by the graph recorder 12, to provide a visual read-out of the torque applied to the shaft. The torque measuring sensors are conventionally secured to the main drive shaft as shown in FIG. 8 and the information, i.e. the electrical signals generated by torque applied to the main drive shaft, are transferred through slip rings into the stationary housing from which they are transferred through the electrical connection line 28 to the graph recorder 12. A model 6050 torque-thrust sensor, available from GSE, Inc., Farmington Hills, Michigan, can, for example, be used for the torque and thrust measuring section 16.

The lower portion of housing 26 which contains the thrust and torque measuring section, extends down over the angle measuring section 18. The angle measuring section is resiliently supported within housing 26, as best seen in FIG. 2. The main body portion 30 of the angle measuring section 18 is cylindrical and is concentrically received within cylindrical housing 26. It is biased outward in housing 26 by a compression spring 32 and is limited in its outward movement by a roll pin 34, or the like, which engages an elongated slot 36 in the side of main body portion 30, so that the main body can telescope within the housing 26 within the limits of the elongated slot 36.

Main body portion 30 is also concentric with the main drive shaft 38 which extends through both the thrust and torque measuring section 16 and the angle measuring section 18. The main drive shaft 38 can, of course, be sectionalized with engaging drive connectors, such as rectangular end portion 40 extending from the thrust and torque measuring section 16, in order to permit the various sections of the instrumented tool 10 to be disassembled more easily. Extending from the lower end portion of the shaft 38 is a driver member 42, here shown as a phillips head screwdriver fitted in a hexagonal recess 44 which receives a correspondingly shaped upper end portion of driver member 42. It is contemplated that the driver member 42 can be of any desired shape to drive a threaded fastener having any head configuration, into a hole.

Figure 3:
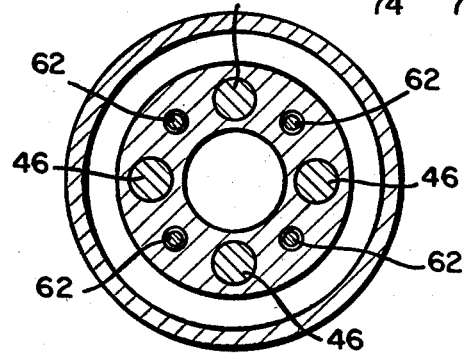
FIG. 3 is a cross sectional view in the direction of line 3—3 of FIG. 1.
Figure 4:
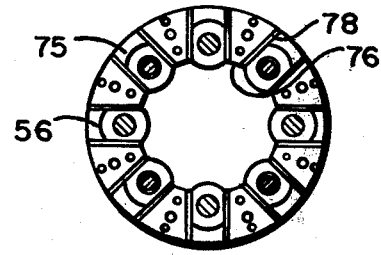
FIG. 4 is a cross sectional view in the direction of line 4—4 in FIG. 1.

Contained within the main body portion 30 are a plurality of cylindrical support rods 46 (in the first preferred embodiment illustrated there are four) which are disposed in an equally angularly and radially spaced pattern concentrically about the main drive shaft 38 in corresponding cylindrical openings in main body portion 30, as best seen in FIG. 3. Each of the support rods 46 is biased outwardly by a spring 48 which pushes against a spring centering collar 50 fitted to a reduced cylindrical upper end portion of each support rod. The lower end portion of support rods 46 are provided with spherically shaped members 52 which engage corresponding cylindrical support members 54 which in turn are engaged in radially extending channels 56 in the base plate assembly 60, as described in more detail below.

The plurality of springs 48 have a combined spring constant less than that of spring 32 so that as the main body portion telescopes into housing 26 the springs 48 will be fully compressed. This permits the main body portion 30 to be forced down to rest against the upper surface of the base plate assembly 60, which is important for reasons set out below.

Also contained within the main body portion 30 are a plurality of sensor rods 62 (in the first preferred embodiment illustrated there are four) which are also equally angularly and radially spaced in a pattern concentrically about the main drive shaft 38, and are also equally angularly spaced from support rods 46. The upper end portion 64 of each sensor rod 62 is cylindrical and is guided within the cylindrical opening 66 in the upper end portion of main body portion 30. The central portion of each sensor rod 62 extends through a linear potentiometer 70 which engages the central portion of the sensor rod 62 in a conventional manner to provide an electrical output from the potentiometer 70 which is transferred through the wires 28 to the graph recorder 12 in order to provide a visual read-out of the output of the potentiometers.

The lower end portion of each sensor rod 62 is provided with a spherically shaped member 72 which is the same as member 52 on the support rods 46. These spherically shaped members 72 are also fitted in corresponding cylindrical support members 73 mounted in substantially radially extending channels 75 in the base plate assembly 60. Base plate assembly 60 is comprised of a cylindrical plate 74 having a central opening 76 through which the driver member 42 will extend when the main body portion 30 is compressed within the housing 26. Each of the cylindrical support members 54 and 73 are captive within the base plate assembly 60 by mating wedge shaped members 78 secured to the base plate by screws or the like so as to form the radially extending channels 56 and 75. The spherically shaped members 52 and 72 are held captive in the cylindrical support members 54 and 73. This can be accomplished by having the upper opening smaller than the diameter of the spherical members 52 and 72. To assemble them the rods 46 and 62 are inserted through the respective cylindrical members 54 and 73 and the spherical members 52 and 72 are then threaded on to the rods.

Spherical members 52 and 72 are thus prevented from becoming disengaged from the base plate assembly 60, but are free to rotate in any direction sufficiently to permit the tool to be rotated so that the axis of rotation of main drive shaft 38 can have an angle with respect to a plane perpendicular to a flat surface upon which the base plate is set, of approximately 30 degrees. This angle is believed to be more than sufficient to allow for misalignment between the axis of rotation of drive shaft 38 and the axis of rotation of the threaded fastener, to account for normal human error in alignment, although a greater angle can be established if necessary.

The graph recorder 12 is of conventional construction, such as for example, an oscillograph of the general type available from Midwestern Instruments Inc., Tulsa, Okla., Model No. TMR 032006. In addition, a signal conditioner should be utilized to amplify the signals coming from the torque and thrust sensors if the above referenced oscillograph is used. Such a conditioner can, for example, be a strain gage excitation and conditioner amplifier also available from Midwestern Instruments Inc., designated Model No. TMI 2600.

In operation, the instrumented tool 10 is positioned over a threaded fastener (not shown) already started into a hole in a surface which is preferably flat and perpendicular to the central axis of the hole and thus the central axis of the threaded fastener, in order that the instrument read-out is accurate and gives the information required. The instrumented tool is then pressed downwards so that the main body portion 30 telescopes within housing 26 to permit the driver member 42 to engage the head of the threaded fastener. The crank portion 22 is then rotated to thread the threaded fastener into the hole.

During insertion of the threaded fastener into the hole, the thrust being applied through the crank handle 14 as well as the torque being applied thereto, are constantly monitored through the torque and thrust sensors contained in section 16 to thus permit a determination that sufficient torque and thrust are being applied so that the driver member will not slip in its engagement with the head of the threaded fastener. Also, the information is useful so that not too much torque and thrust are being applied so as to cause damage to the head of the threaded fastener in that manner, and so far as the torque is concerned, to be certain that not too much torque is being applied to the threaded fastener which could cause it to break. It is a further advantage to measure the torque so that sufficient torque is applied to tighten the bolt for maximum holding power which is easily determinable by well known practices.

The graph recorder 12 can be adjusted to provide an appropriate scale on the read-out so it can be calibrated to provide a direct read-out of the torque and thrust being applied to the threaded fastener. The manner of doing this is also well known in the art and will therefore not be discussed in detail herein.

If the axis of rotation of the main drive shaft 38 is not perpendicular to the surface upon which the base plate assembly 60 is supported, an indication of this will be provided by the angle measuring section 18. In order to provide this information the potentiometers 70 are initially calibrated at a zero position at which the axis of rotation of the main drive shaft 38 is perpendicular to the base plate. This is most easily accomplished by compressing the springs 48 sufficiently to bring the lower surface of main body portion 30 into surface-to-surface contact with the upper surface of base plate assembly 60. Thus, during use of the device, when these two surfaces are not in complete surface-to-surface contact it will be indicated by the potentiometer outputs and associated visual or electronic output, and can be easily corrected by rocking the device until perpendicularity is obtained.

Once the potentiometers are calibrated, an inclination of the instrumented tool 10 with respect to the plane perpendicular to the surface upon which base plate assembly 60 rests will cause a visual read-out in graph 12. This is accomplished as a result of the sensor rods 62 moving within their respective potentiometers 70. If movement is in a plane passing through two potentiometers and through the axis of the drive shaft, the read-out will be from those two potentiometers only since the other potentiometers will not be changed because the sensors extending therethrough will not be moved within them. However, in the case where angular movement of the main drive shaft with respect to the surface upon which the base plate assembly 60 sets is not in either plane, all four potentiometers will be changed.

In this case, it is easy to calculate the acutal angle in such an azimuth plane between the axis of rotation of the main drive shaft and the surface upon which base plate 60 sets. This is accomplished by using the following formula:

$$\Theta = \text{ARCTAN} \sqrt{\tan^2 A + \tan^2 B}$$

Where $\Theta$ is the tool inclination angle in the azimuth plane and A and B are the angular readings of the two angle sensors.

The tool may then be uprighted perpendicular to the surface by observing the read-outs of the potentiometers so that the axis of rotation of the drive shaft 38 is maintained relatively parallel to the axis of rotation of the threaded fastener.

Figures 5, 6, 7:
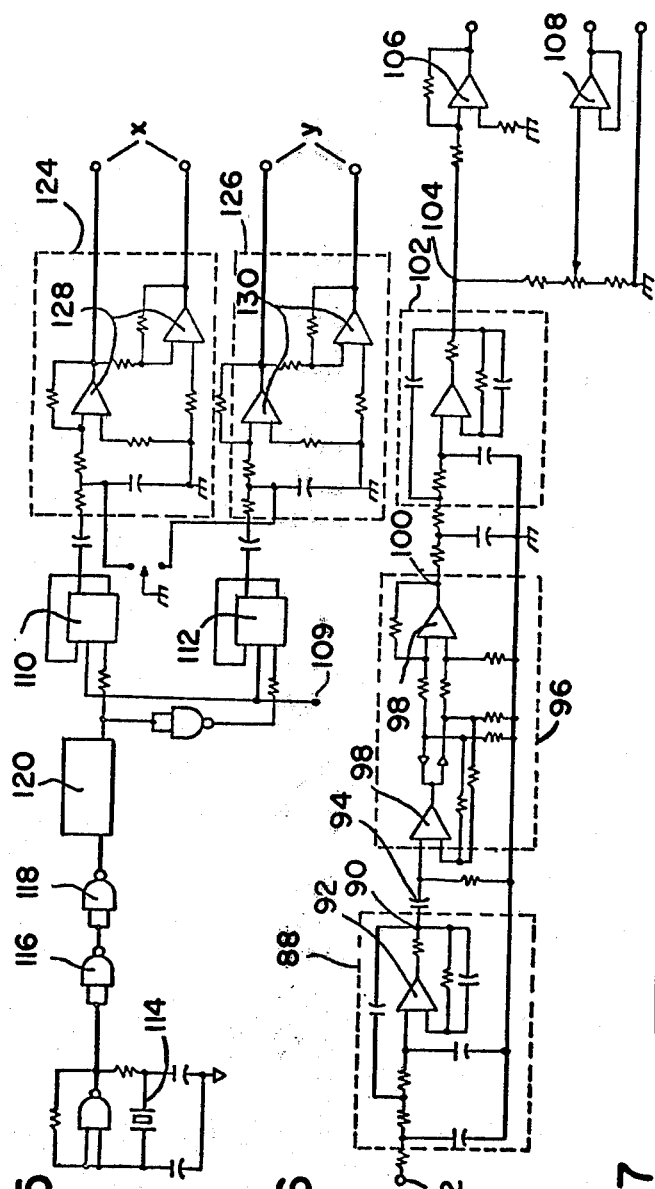
FIGS. 5-7 are schematic circuit diagrams of the first preferred embodiment of the present invention illustrated in FIG. 1.

In the first preferred embodiment calculation of the above equation is accomplished by the circuitry illustrated in FIGS. 5-7. Basically the circuitry provides input voltages to a plurality of potentiometers and modifies the resultant output voltages to provide the necessary signals to the recording equipment described above.

Referring first to FIG. 7, there is illustrated a voltage supply and balance network associated with the two pairs of potentiometers 70 disposed in perpendicular planes referred to for simplicity as the x and y planes. A square wave input to the x and y terminals in FIG. 7 is provided from the x and y output terminals of the circuit of FIG. 5, in such a manner that the square wave input to terminals x will be 90 degrees out of phase with the square wave input to terminals y. This input voltage to the x and y terminals becomes the excitation voltage for potentiometers 70.

The resultant voltage from the potentiometers is combined and transmitted from terminal 80 to input terminal 82 (FIG. 6). Solution of the above referred to equation, is essentially accomplished in the circuitry illustrated in FIG. 7. The reason for this is that the summation of the square wave output of the potentiometers 70 is in fact essentially the same as the summation of two sine waves 90 degrees out of phase. The resultant vector summation is determined in the circuitry illustrated in FIG. 6, as described below.

Referring again to FIG. 7, a first pair of potentiometers 84 are connected in the balance circuitry of potentiometers 70 in order to compensate for differences in resistance in the potentiometers. A second set of potentiometers 86 are included in the output signal circuitry from the potentiometers 70 in order to adjust for off-set in the scale reading on the output of the recording equipment.

Referring now to the circuitry of FIG. 6, the square wave output from terminal 80 of FIG. 7 is the input to terminal 82 of FIG. 6. The first portion of the circuitry of FIG. 6, indicated within the phantom line area 88, is a three pole active filter circuit with an associated feedback network producing a sine wave output at terminal 90 which is the actual resultant solution of the equation set out above. The integrated operational amplifier circuit 92 can be of conventional nature such as an LF 356 H or N available from National Semiconductor Inc.

The output from terminal 90 is AC coupled through capacitor 94 to a full wave rectifier circuit shown within phantom area 96. This circuit utilizes a pair of integrated circuits 98 of conventional construction such as MC 1458 SCP available from Motorola Corp. The circuitry in area 96 produces a full wave rectified sine wave without diode loss at pin 100.

The ouput from pin 100 is then fed into circuit 102 which is also a three pole active filter circuit providing a DC voltage at output terminal 104 which is amplified, but proportional to the full wave rectified sine wave produced at the output terminal 100.

The DC voltage from terminal 104 is then passed through operational amplifiers 106 and 108. Amplifier 108 supplies voltage to the graph recorder 12 in a conventional manner. The output from operational amplifier 106 is used as an input through terminal 109 to the D flip-flops 110 and 112 (MC 14013CP) of the circuitry illustrated in FIG. 5. This feedback is used to modulate the square wave being used to excite the potentiometers 70 to compensate for nonlinearity of the arctangent function being calculated which is a procedure commonly used under such conditions.

In order to provide the excitation voltage for the potentiometers, a crystal oscillator 114 is used having, for example, a 3.6 mHz operating frequency although this is not critical. The signal is then passed through a pair of NAND gates 116 and 118 which act as wave shaping inverters in order that the signal coming from gate 118 is a square wave of the frequency and phase as the unshaped signal generated by oscillator 114. The signal from gate 118 is then fed into a counter 120 which is used to divide the high frequency signal down to approximately 900 hertz, for example, which is a more reasonable frequency for exciting the potentiometers 70 used.

The output signal from counter 120 is then split and fed into flip-flops 110 and 112, with the signal into 112 being inverted by NAND gate 122. The outputs of the flip-flops 110 and 112 are thus 90 degrees out of phase, as desired for exciting the potentiometers 70. These signals are then passed through respective amplifiers circuits 124 and 126 shown in the dotted line areas of FIG. 5, in order to provide the necessary amplitude for exciting the potentiometers. It is preferable that the amplifier units 128 and 130 in the circuits 124 and 126 are fast response operational amplifiers, such as MC 1458 SCP, in order that they respond to the rapid changes produced in the signals from the flip flops as a result of the modulating signal from amplifier 106 as described above.

It can therefore be seen that with the above circuitry as described in connection with FIGS. 5, 6 and 7, the solution to the above formula can easily and accurately be obtained and utilized as an input for operating the graph recording equipment 12 of conventional construction.

Although a manual crank is provided in the preferred embodiment for providing the torque and thrust for inserting the threaded fastener, a motor or other means may also be utilized. In addition, if such a motor means is provided the angular read-out from the graph recorder 12 could also be utilized to interrupt operation of the device if the angle of inclination is too great with respect to the axis of rotation of the threaded fastener. Further, it is contemplated that provision can be made for monitoring an envelope of parameters including torque, thrust and angle of inclination so that if, in operation, a value is monitored outside of the envelope the instrument will be shut off, sound an alarm, etc. All of these modifications can likewise be used with the drill, tap or wrench modifications described below.

Referring now to the second preferred embodiment of the present invention as illustrated in FIG. 11, it is basically constructed the same as the embodiment of FIG. 1, but is adapted for attachment to a drill motor 200. Drill motor 200 is of any conventional construction, for example, of the hand held drill type, but which has had its lower portion adapted for being bolted to the angle measuring device by a plurality of bolts 202. In this embodiment the upper portion of the instrumented tool includes the cylindrical mounting cap 204 which is provided with a flange 206 through which the plurality of bolts extend and bolt into the drill motor 200 for holding the instrumented tool securely to the drill motor.

The central cylindrical opening 208 in the mounting cap 204 is of sufficiently large diameter to permit the chuck 210 of the drill motor to have clearance therein so that it is free to rotate while drilling. Provision can be made in the side of the housing for inserting a key (not shown) to release the drill 212 from the chuck in a conventional manner without unbolting the instrumented tool from the drill motor. In this embodiment, the thrust and torque measuring section 16 of the previous embodiment is omitted and only the angle measuring portion is utilized in order to establish the perpendicularity or desired angle of the drill 212 to the surface 214 of the object 216 in which the hole is to be drilled. It is also to be noted that although this second preferred embodiment is described in connection with a drilling device it can likewise be utilized for tapping, or as a power driven wrench.

Bolted to the mounting cap 204 by a plurality of bolts 218 is a cylindrical upper housing 220. A lower cylindrical housing 222 is slidably received within upper housing 220. Bolt 224 is threaded into the lower edge portion of the upper housing 220 and rides in an elongated slot 226 formed in the side of the lower housing 222 to thus permit telescoping movement of the lower housing 222 within the upper housing 220. A compression spring 228 is contained within the upper housing 220 and compressed between the shelf 230 on the mounting cap 204 and the upper edge 232 of lower housing 222 to bias the lower housing in the extended position as shown in FIG. 11.

The lower housing 222 contains a plurality of potentiometers and support rods of identical construction and arrangement of those described in detail above in connection with the first preferred embodiment. The central opening in the lower housing 222 has been expanded to accommodate the drill as shown. The construction of the base plate assembly 234, is somewhat different from the construction of base plate assembly 60 in the first preferred embodiment and is illustrated more clearly in FIGS. 17-19. Although the base plate assembly 234 accomplishes the same function as the base plate assembly 60, rather than utilizing the radially extending channels 56 and 75 to permit movement of the cylindrical support members 54 and 73, cylindrical bores 236 are utilized instead due to the relative ease in production of this second form over the first.

Figure 18:
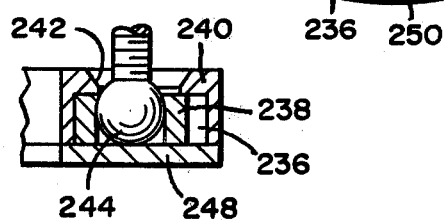
FIG. 18 is a vertical cross sectional view along the line 18—18 of FIG. 17.

The diameters of the cylindrical bores 236 are based on the largest displacement necessary of the cylindrical support members 238, which are the same as the cylindrical support members 54 and 73, which is needed to permit the frame structure to be tilted the desired amount relative to the base plate assembly 234. Cylindrical bores 236 are formed in the lower portion of the main base plate 240, as shown in FIG. 18, and a reduced tapered opening 242 is formed in the upper portion of base plate 240 with the taper being sufficient to permit the support plate or potentiometer rod to be tilted the desired angle relative to the base plate without contacting the side of the base plate.

The cylindrical support member 238 is constructed the same as cylindrical support members 54 and 73 so as to hold the respective spherically shaped members 244 and 246, which are likewise identical to spherically shaped members 52 and 72. A cover plate 248 is bolted to the bottom of base plate 240 with a plurality of bolts 250 to hold the assembly together after all of the cylindrical support members 238 and spherically shaped members 244 and 246 are positioned in the base plate 240. Both the base plate 240 and cover plate 248 are provided with a central circular opening going completely therethrough in order to permit the drill to pass through to the work piece.

Referring again to FIG. 11, the lower cylindrical housing 222 is essentially the same as the main body portion 30 of the embodiment of FIG. 2. Likewise, the support rods 250 and sensor rods 252 are identical to support rods 46 and sensor rods 62 and also potentiometers 254 are the same as potentiometers 70 of the embodiment of FIG. 2.

As an alternative to the use of the graph recorder 12 which is discussed above with regard to the embodiment of FIG. 1, the instrumented tool illustrated in FIG. 11 is provided with an angle indicator 260 which is shown in plan view in FIG. 12. Angle indicator 260 is secured to the side of the upper housing 220 with a mounting bracket 262 which conforms to the cylindrical configuration of the upper housing. The angle indicator is relatively thin as can be seen from FIG. 11 and is basically of printed circuit construction with a pair of perpendicular cross bars formed of a plurality of lights 264. The four potentiometers 254 are positioned 90 degrees apart so that two each are positioned in perpendicular planes which are aligned with the cross bars formed by the lights 264, so that the electrical impulses received from the potentiometers can be coordinated with the positions of the cross bars on the angle indicator 260.

The printed circuit board in angle indicator 260 is so constructed that upon receipt of calibrated signals from the potentiometers 254, when the drill 212 is positioned exactly, i.e., within the design tolerance limits of the equipment, perpendicular in the two orthogonal planes of the potentiometers relative to the reference plane 214, only the central light 266 will be lit. As the drill is positioned askew to the reference plane 214 the lights 264 in the direction of tilt of the drill will light individually. As the angle of tilt of the drill relative to the reference plane 214 increases the corresponding lights 264 which are further out from the central light 266 will light while the inboard lights 264 will go out.

The amount of angular tilt of the drill relative to the reference plane can be correlated to the positions of the lights. For example, it can be calibrated so that every five degrees of tilt will cause a change in which a light or lights are lit until the outermost light is reached at which point any further tilt will cause the outermost lights to continue to be lit until the drill is brought to a more perpendicular position. Then, as the drill approaches perpendicularly, the lights will progress inwardly toward the central light 266 at which point the drill will be exactly perpendicular to the reference plane in the two orthogonal planes corresponding to the planes of the potentiometers 254.

In order to permit an object to be drilled at an angle other than exactly perpendicular to the surface, an azimuth biasing feature can be included in the angle indicator 260. This can be accomplished through the use of angle indicating windows 268 and 270 which can, for example, be in the form of LCD or LED numerical read-outs. Thus, if it is desired to slant the angle of the drill relative to the surface in the plane aligned with the angle indicating windows 268 and 270, the appropriate desired angle can be indicated in either of the windows 268 or 270, depending upon the direction of slant desired from the central vertical position, by adjusting the thumb wheel 272 which adjusts the appropriate resistance internally of the angle indicator in order to bias the circuit to indicate that the central light 266 will be lit when the drill is at the appropriate angle in the azimuth plane.

Figure 21:
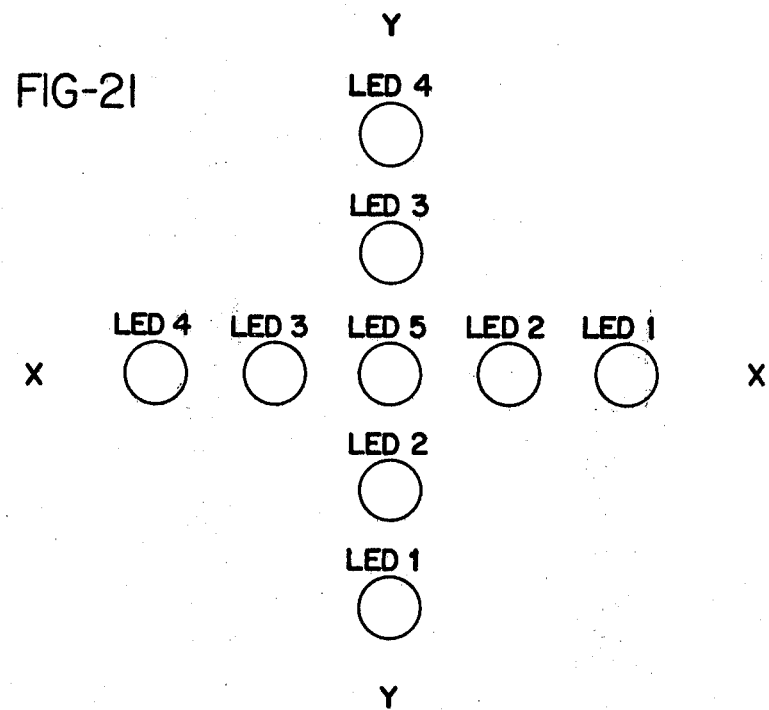
FIG. 21 is a schematic illustration of the light emitting diode layout used on several embodiments.
Figure 22:
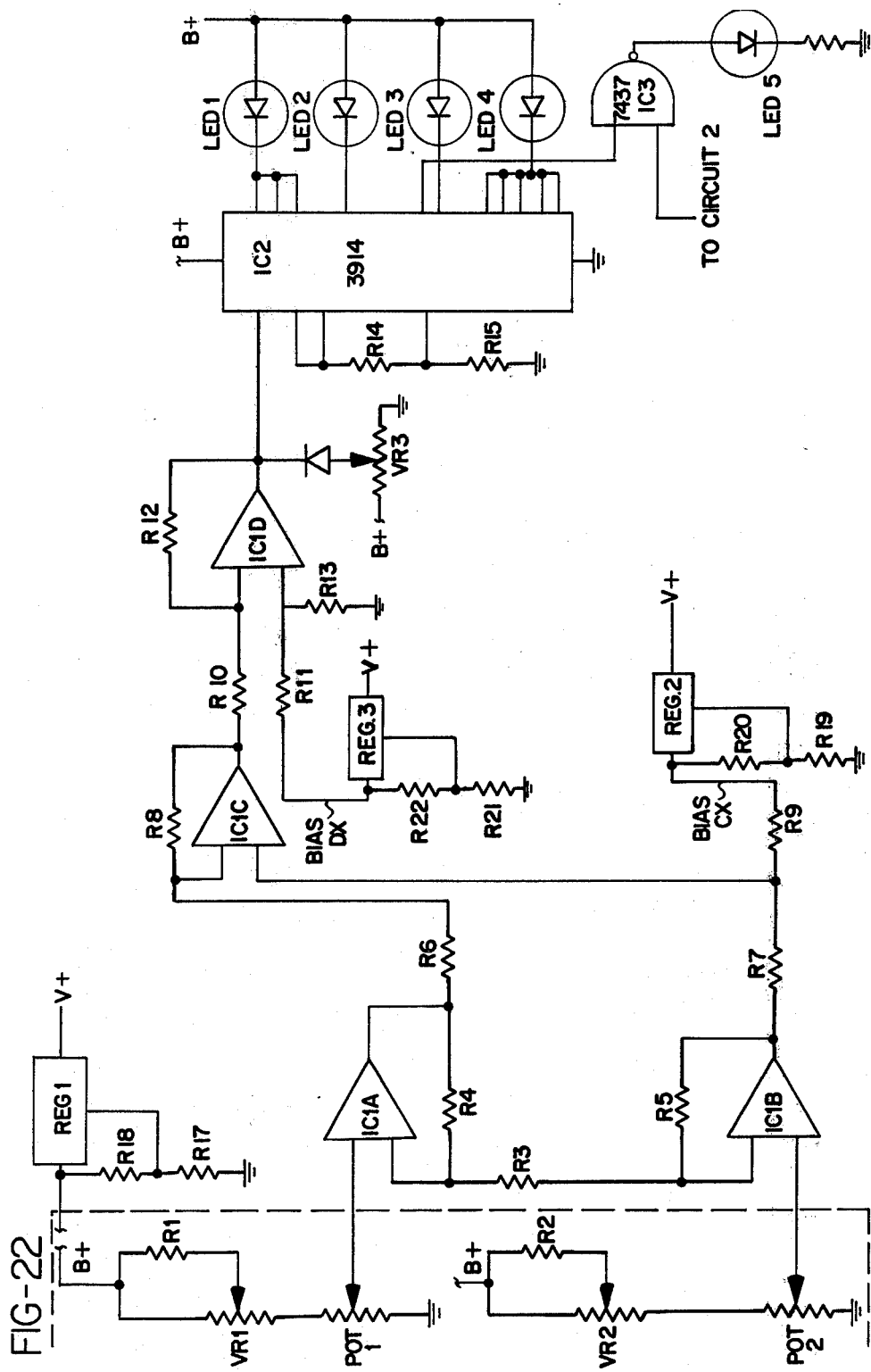
FIG. 22 is a circuit diagram of circuitry which can be utilized to operate the light system illustrated in FIG. 21 when utilized with any of the embodiments of instrumented tool.

As an example of the circuitry which can be utilized to translate the signals received from the potentiometers into the visual readout provided by angle indicator 260, the circuit disclosed in FIG. 22 is provided. Also, an enlarged schematic representation of the light layout for the angle indicator 260 is provided in FIG. 21, only 9 LEDs (light emitting diodes) being utilized. It is to be understood that any number of LEDs can be used and that the following description in conjunction with FIGS. 21 and 22 is exemplary only.

Referring to the circuit of FIG. 22 integrated circuits IC1A, B and C together form an instrumentation amplifier that outputs a gained voltage linerally proportional to the degree of nonperpendicularity as sensed by the sensor potentiometers 1 and 3 (X axis). The combination of VR1 and R1 limit the voltage to sensor potentiometer 1 and the combination of VR2 and R2 do the same for sensor potentiometer 3. The gain of the amplifier formed by IC1A, B and C is controlled by the value of R3.

Bias CX is used to adjust the output voltage of IC1C to approximately mid-range at 0 angle of inclination. IC1B is a differential amplifier with gain. This circuit takes the output of IC1C and subtracts bias DX. This difference is then amplified to give the degree of sensitivity desired.

Bias DX is obtained from adjustable voltage regulator REG-3 and is used to program and offset angle or used to measure an unknown angle. The output of IC1D is then fed into IC2 which is an analog voltmeter than can drive up to 10 LEDs (light emitting diodes). In the normal usage of this device, an analog input of 10 percent of full scale would light the first LED, 20 percent of full scale would light the second LED, - -.

In the circuit illustrated, the output of IC1D is set for 50 percent of full scale of the voltmeter at 0 angle of inclination and thus lights LED 5 through IC3. LED's 2 and 3 light whenever the frame of the device is inclined off the true perpendicular position by more than the first threshold level.

LEDs 1 and 4 light whenever the second threshold level is exceeded and remain on at any greater angle, because the remaining LED outputs are "or" tied to LEDs 1 and 4. The display can be expanded to drive an almost unlimited number of LEDs by cascading several voltmeter circuits together. In normal operation the output from IC1D ranges from 0 to 100 percent of full scale of the voltmeter as the angle of inclination is changed from the maximum positive angle to the maximum negative angle. LED 1 would normally go out when the input is less than 10 percent of full scale. Diode D1 and VR3 form a low limit voltage clamping circuit which prevents the output from going below the 10 percent level.

The circuit described above is for the X axis. The Y axis consists of a duplication of IC1, IC2, REG-2 and REG-3 and their associated circuitry. IC3 is common to both axes and is REG-1.

Thus, in order to operate the drill at the desired angle, whether it be exactly perpendicular to the reference surface 214 or at a biased angle as described above, the operator need only observe the two cross bars of lights until they converge on the central light and until only the central light 266 is lit, at which point the drill is at the desired angle. When the drill is positioned in a plane other than in one of the two planes indicated by the positions of the cross bars, the lights 264 in both cross bars will be lit simultaneously. Thus if the drill is slanted towards the upper right hand quadrant of FIG. 12, and is at, for example, a slant of ten degrees from the desired position, the two lights 274 and 276 will initially be lit. As the drill is brought to the vertical, or desired angular position, the lights inboard of the lights 274 and 276 will sequentially light as the lights 274 and 276 are extinguished and subsequently the light 266 will be the only light lit when the drill is at the exact position for drilling.

The circuitry of FIGS. 5–7 as described above can be utilized with this second embodiment except for the angle resolving feature which is not needed because of the use of the perpendicular cross bars of lights which are used instead. It is to be understood, however, that the graph recorder 28 could be utilized in conjunction with or in place of the light bars in any of the disclosed embodiments if a more exact location and permanent read-out of the relative position of the drill to the reference plane 214 is desired.

Figure 13:
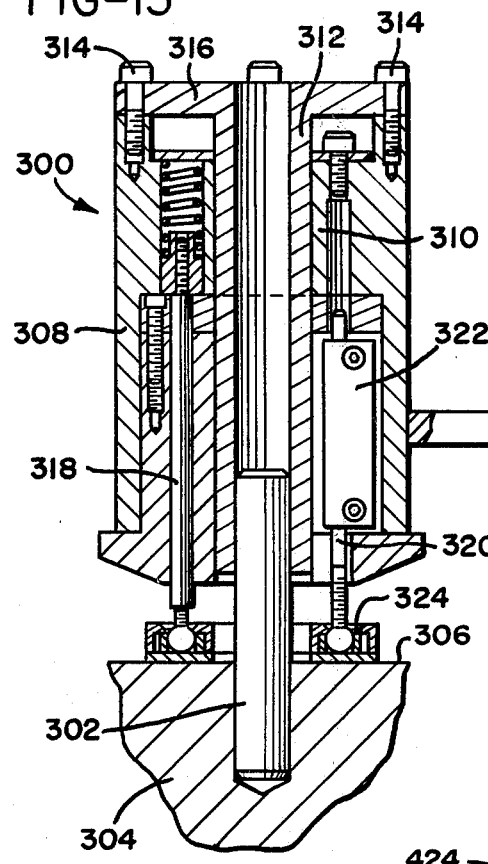
FIG. 13 is a vertical cross sectional view through a third preferred embodiment of the present invention, where it is utilized as a stud perpendicularity measuring device.
Figure 14:
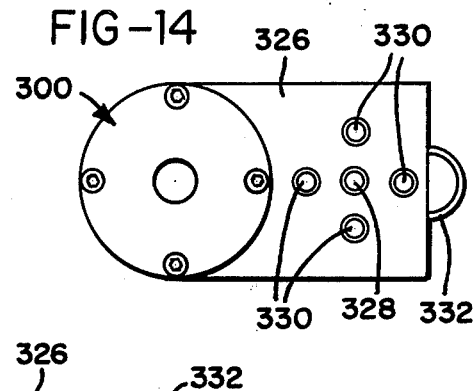
FIG. 14 is a plan view of the embodiment of FIG. 13.

Referring now to a third alternative embodiment of the present invention as illustrated in FIGS. 13 and 14, this device is again very similar to the embodiment of FIG. 11 as well as that of FIG. 2, but is directed in this instance to measurement of the position of a stud 302 which is fixed in an object 304 and extends from a reference surface 306. In this embodiment, the main housing 308 is constructed very similar to the lower housing 222 of the embodiment of FIG. 11, and since there is no need for compressing an upper portion of the housing as there is in in the embodiments of FIGS. 2 and 11, this feature has been eliminated from the embodiment of FIG. 13.

In this embodiment, the central opening 310 defined in the main body 308 is of larger diameter than the stud 302 to be checked, so that there is room to receive a sleeve 312 having an internal bore diameter which provides a slip fit over the upper portion of the stud 302. In this way, if other stud diameters are needed to be checked, the sleeve 312 can simply be removed and another sleeve inserted having an appropriate bore diameter for the diameter of stud to be checked. Sleeve 312 is held in the main body portion 308 by a plurality of bolts 314 extending through the collar portion 316 and into threaded holes in the upper portion of the main body 308.

The support rods 318 and sensor rods 320, as well as the potentiometers 322 are the same as in the first two described embodiments and positioned in the same angular relationship around the central opening in the housing. The base plate 324 is likewise preferably like the embodiment of FIGS. 17–19, and the angle indicator 326 is also preferably like the embodiment of FIG. 11, although again, if more accuracy or a permanent record is desired, the graph recorder 28 could alternatively or additionally be utilized.

With this embodiment, the instrumented tool 300 is merely slipped over the stud so that the sleeve 312 engages the stud with the stud extending up through the base plate 324. If the stud is perpendicular to the reference surface 306 only the central light 328, as shown in FIG. 14, will be lit. However, if the stud is not perpendicular the appropriate light or lights 330 will be lit, indicating the direction of angle of the stud relative to the reference surface 306. Again, a thumb wheel 332 is provided in order to bias the printed circuit contained within the angle indicating device 326 so that if the stud is desired to be positioned at some angle relative to the reference surface 306 the lighting system can be adjusted accordingly so that only the central light 328 will be lit when the stud is at the desired relative angle.

In the angle indicator 326 as shown schematically in FIG. 14, only four lights outside of a central light 328 are utilized to indicate a deviation from the exact central or desired angle of position. It is to be understood that a greater number could be utilized, as in the embodiment of FIG. 12, if further indication of the deviation of the stud from the desired position is desired. Likewise, the LCD or similar numerical indicators such as 268 and 270 in FIG. 12, can be utilized for the biasing feature as described above.

Figure 15:
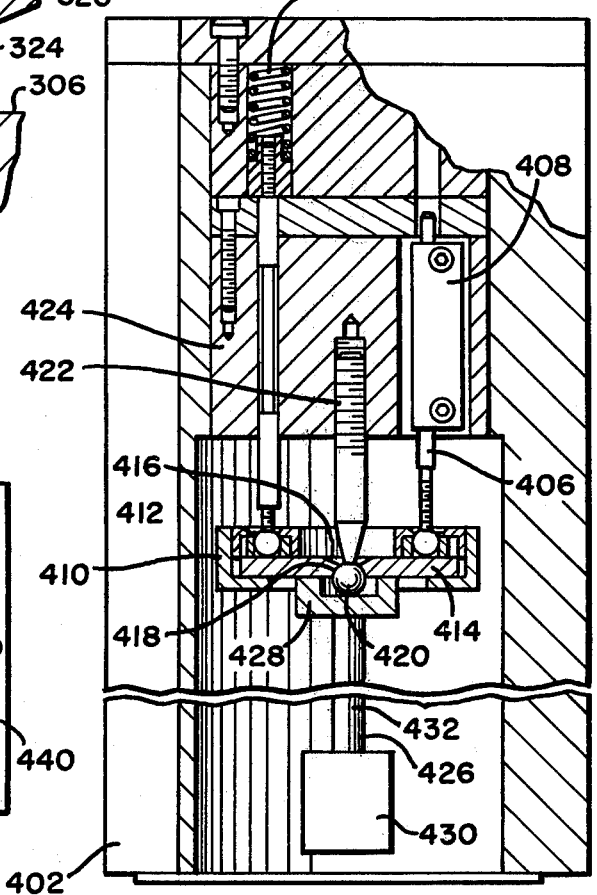
FIG. 15 is a vertical partial cross sectional view of a fourth preferred embodiment of the present invention, wherein it is utilized as a level.
Figure 16:
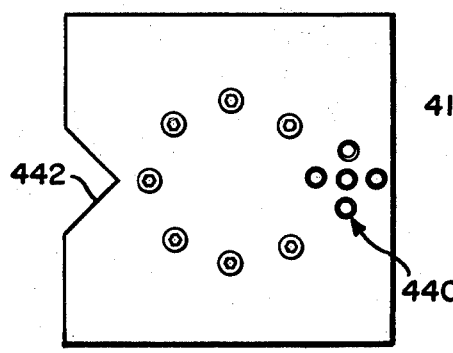
FIG. 16 is a top plan view of the embodiment of FIG. 15.

Referring now to a fourth alternative embodiment of the present invention as illustrated in FIGS. 15 and 16, this variation of the present invention is intended to be utilized as a level for indicating the true perpendicularity or vertical position of an object relative to the ground. In this embodiment, the instrumented tool 400 is encased with a completely enclosed housing 402. The support rods 404 and sensor rods 406 are again the same as the previous embodiments, as is also true for the potentiometers 408. In this case, however, construction of the base plate assembly 410 is somewhat different.

Figure 17:
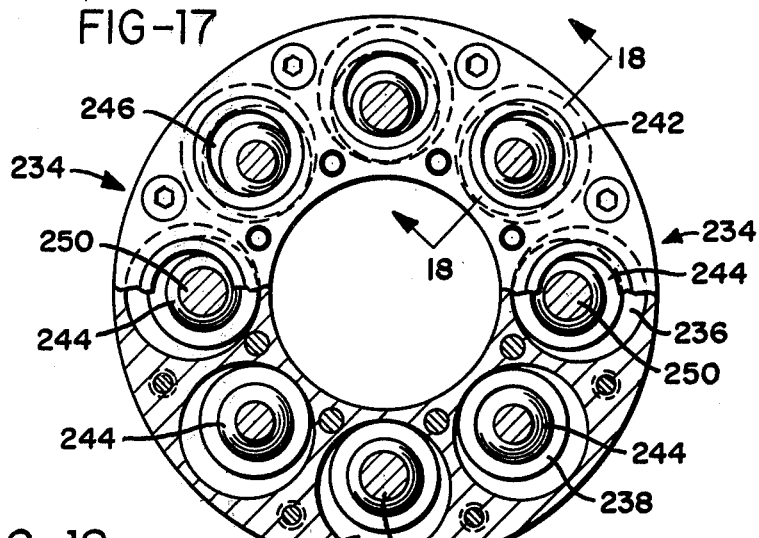
FIG. 17 is a horizontally cross sectional view through the base plate assembly of FIG. 11.
Figure 19:
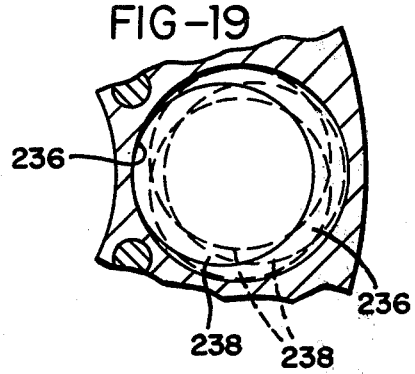
FIG. 19 is an enlarged view of one of the cylindrical recesses of the base plate of FIG. 17.
Figure 20:
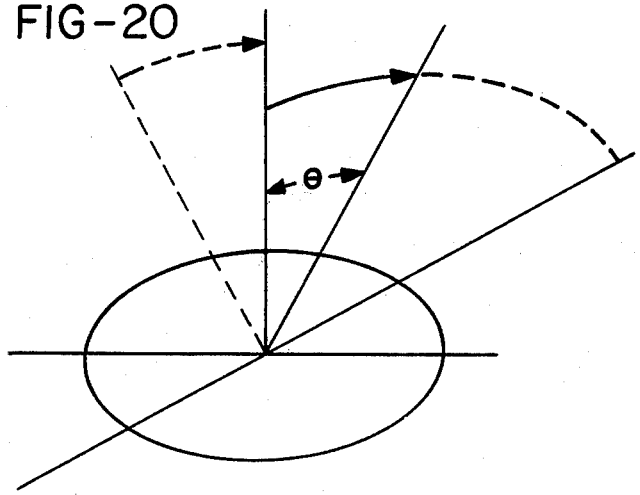
FIG. 20 is a schematic illustration of the relative angular readings between a frame and the reference plane with an angle established in an azimuth plane.

Each of the sensor rods 406 and support rods 404 are captive within a base plate 412 in essentially the same manner as illustrated in FIGS. 17–19. However, the cover plate 414 is provided with a central opening defined by an upper conical surface 416 and a lower spherical surface 418. The spherical surface 418 engages a corresponding spherical ball 420 suspended from a stud 422 threadedly secured in the main body portion 424 of the instrumented tool 400. The upper conical surface 416 permits the cover plate 414 to be tilted in any direction without causing contact between the support stud 422 and the base plate 414 which would otherwise inhibit operation of the device.

Extending downwardly from cover plate 414 is a pendulum like member 426 which is suspended from a mounting bracket 428 fixedly secured to the bottom of cover plate 414. A weight 430 is fixed to the end of the long rod 432 and acts as a plumb for the base plate in order to maintain the base plate exactly horizontal relative to the ground. The appropriate length of the rod 432, as well as the appropriate weight of member 430, can be established depending upon the frictional forces found in the interconnection of the base plate and the sensor rods 406 and support rods 404, support stud 422, and also the force required to overcome the compression springs 434.

In operation, this latter preferred embodiment is utilized by positioning the housing against the generally vertical surface to be examined, and the exact angle from the vertical will be indicated through the angle indicator light system shown generally at 440 in FIG. 16, which is the same as the light system as described above in connection with FIGS. 12 and 14. In addition, if a cylindrical surface, such as a pipe, is being examined for its relative vertical position, it can be positioned in the V-shaped notch 442 extending along the entire length of one side of the housing 402, and an indication of its relative vertical position can likewise be established. Also, as with the above referred to embodiments, a biased angle in an azimuth plane can be established in the same manner as with the angle indicator instruments described in connection with FIGS. 12 and 14.

The use of the light bars as described in several of the preferred embodiments discussed above, have several distinct advantages over the use of the graph recorder. For example, it is possible to easily, visually determine the direction of inclination of the device relative to the base plate and thus the surface being drilled, etc., and to move the device in a direction such that the lights will converge on the center light of the cross bars so that the frame structure is at the desired angle relative to the surface. This is true regardless of whether the desired angle is perpendicular or is at an angle to the surface in an azimuth plane, since the position of the azimuth plane can also be established by utilizing the cross bars of lights.

The cross bars are preferably positioned relative to the potentiometers so that one row of lights corresponds to potentiometers in one plane while the perpendicular row of lights corresponds to the potentiometers in a perpendicular plane. Thus, when the device is positioned on the object relative to which the angle is to be measured, it is maneuvered into a position where the desired azimuth plane will correspond to the location of the potentiometers. The device is then tilted in such a manner to bring the lights in the light bar perpendicular to the light bar in the azimuth plane, into the center position so that only movement in the azimuth plane is remaining. The operator then only needs to maneuver the device in the azimuth plane until the central light is the only light lit.

In those devices where a bias angle can be provided, the procedure is similar in that initially the device is maneuvered to bring the lights in the cross bar which is perpendicular to the azimuth plane, into the central light, and then the device is maneuvered in the azimuth plane until only the central light is lit and thus the device will be positioned at the desired angle which is originally set into the biasing function described above. This biasing function can likewise be utilized to establish the angle of inclination of one surface relative to another by essentially reversing the procedures described above. For example, the device can be positioned with the base plate on one surface and the frame resting against the other surface; the device is then maneuvered until the light bar perpendicular to the azimuth plane light bar indicates a central light reading and then the bias wheel is adjusted until a similar reading occurs in the azimuth light bar and then the angular position of the one surface relative to the other can be read in the LCDs or similar read-out provided as described above.

In view of the foregoing descriptions of the several embodiments, it can be seen that the basic system of the present invention can be utilized in numerous environments for establishing the relative position of one member to another or relative to the ground. Although the foregoing descriptions illustrate the preferred embodiments of the present invention, it is evident that many other variations are possible. All such variations as would be obvious to one skilled in the art are intended to be included within the scope of the invention as defined by the following claims.

What is claimed is:

1. An angle measuring device, comrising:
 a frame;
   means providing a reference plane;
   means interconnecting said frame and said reference plane means for two dimensional pivotal movement of said frame about a fixed location in said reference plane means, and for sensing the relative angular position between said frame and said reference plane means and providing electrical signals indicative of said position, and including a plurality of spaced sensing means disposed about an axis in said frame which intersects said reference plane at said fixed location, each said sensing means including a rod mounted in said frame for longitudinal movement parallel to said axis and pivotally connected to said reference plane means; and
 means receiving said signals and providing an indication of said relative angular position.

2. An angle measuring device as defined in claim 1 wherein said interconnecting means includes said plurality of spaced sensing means being disposed at equally angularly spaced locations about said axis in said frame.

3. An angle measuring device as defined in claim 2 wherein said sensing means further includes:
 a plurality of potentiometers mounted in said frame, one each slidably receiving a respective one of said rods and operable to produce an output signal indicative of the relative position of the rods in the potentiometers.

4. An angle measuring device as defined in claim 3 wherein there are four potentiometers, two each in mutually perpendicular planes intersecting along said axis.

5. An angle measuring device as defined in claim 3 wherein said signal receiving means includes:
 means for resolving the relative angular position beween said frame and said reference plane from signals received from said potentiometers.

6. An angle measuring device as defined in claim 5 wherein said means providing a reference plane includes:
 a plate having a bottom surface engagable with a reference surface with regard to which the relative angle of said frame is to be measured;
 a plurality of cylindrical support members supported in radially extending channels formed in said plate for limited movement therein and disposed in equally angularly spaced locations concentrically about said fixed location in said reference plane means; and
 each said rod having an outer end portion pivotally mounted to a respective said cylindrical support member.

7. An angle measuring device as defined in claim 5 wherein said means providing a reference plane includes:
 a base plate having a bottom surface engagable with the reference surface with regard to which the relative angle of said frame is to be measured;

a plurality of cylindrical support members supported in equally angularly and radially spaced cylindrical recesses formed in said base plate for limited radial and tangential movement therein and disposed concentrically about said fixed location in said reference plane means; and each said rod having an outer end portion pivotally mounted to a respective said cylindrical support member.

8. An angle measuring device as defined in claim 6 or 7, including:
a central cylindrical opening defined in said frame concentric with a central cylindrical opening defined in said base plate, whereby said angle measuring device can be positioned over a stud with said base plate surrounding said stud and said stud engaging the surfaces of said frame defining said cylindrical opening.

9. An angle measuring device as defined in claims 6 or 7, including:
plumb means secured to said base plate for holding said base plate horizontal with respect to the ground;
said frame having a surface perpendicular to said base plate for engaging a member whose angle relative to the ground is to be measured.

10. An angle measuring device as defined in claims 6 or 7, including:
a drill motor;
means mounting said frame to said drill motor;
said frame having a central cylindrical surface defining an opening through which a drill can be inserted into said drill motor;
said base plate having a central cylindrical opening defined therein concentric with said cylindrical opening in said frame, through which said drill can pass;
said frame being telescoping towards said base plate to permit said drill to extend through said base plate.

11. An angle measuring device as defined in claim 8 wherein said signal receiving means includes:
a pair of perpendicularly disposed light cross bars;
means connecting said potentiometers to said cross bars for indicating in a light pattern the relative angular position between said frame and said reference plane means.

12. An angle measuring device as defined in claim 9 wherein said signal receiving means includes:
a pair of perpendicularly disposed light cross bars;
means connecting said potentiometers to said cross bars for indicating in a light pattern the relative angular position between said frame and said reference plane.

13. An angle measuring device as defined in claim 10 wherein said signal receiving means includes:
a pair of perpendicularly disposed light cross bars;
means connecting said potentiometers to said cross bars for indicating in a light pattern the relative angular position between said frame and said reference plane means.

14. An angle measuring device comprising:
a frame;
a base plate;
a plurality of equally angularly spaced parallel rods disposed about a central axis in said frame and pivotally connected to said base plate;
sensing means mounted in said frame and receiving at least some of said rods for sensing the position of said rods relative to said sensing means and providing electrical signals indicative of said relative positions; and
means receiving said signals and providing an indication of the relative angular position between said frame and said base plate.

* * * * *

UNITED STATES PATENT AND TRADEMARK OFFICE
CERTIFICATE OF CORRECTION

PATENT NO. : 4,338,723
DATED : July 13, 1982
INVENTOR(S) : Harry Louis Benjamin

It is certified that error appears in the above—identified patent and that said Letters Patent is hereby corrected as shown below:

Claim 14, line 9, delete "sensing means" and insert therefor --frame--.

Column 12, line 44, "than" should be --that--.

Signed and Sealed this

Twenth-eighth Day of September 1982

[SEAL]

Attest:

GERALD J. MOSSINGHOFF

Attesting Officer    Commissioner of Patents and Trademarks